May 17, 1932.  G. RAASCHE  1,859,059
AUTOMATIC BALANCE
Original Filed Aug. 9, 1930   3 Sheets-Sheet 1
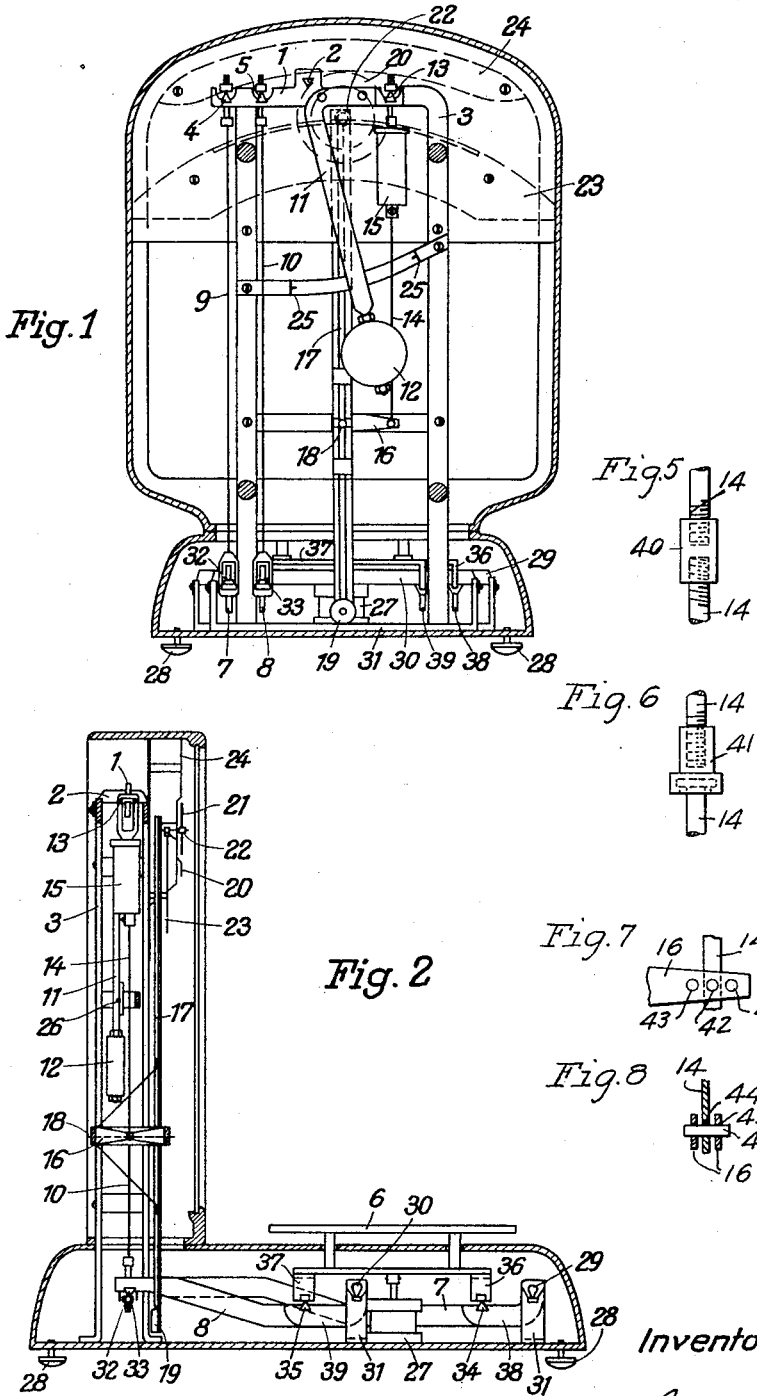
Inventor:
Gerard Raasche,
by N. Schoenborn
attorney.

May 17, 1932.  G. RAASCHE  1,859,059
AUTOMATIC BALANCE
Original Filed Aug. 9, 1930   3 Sheets-Sheet 2
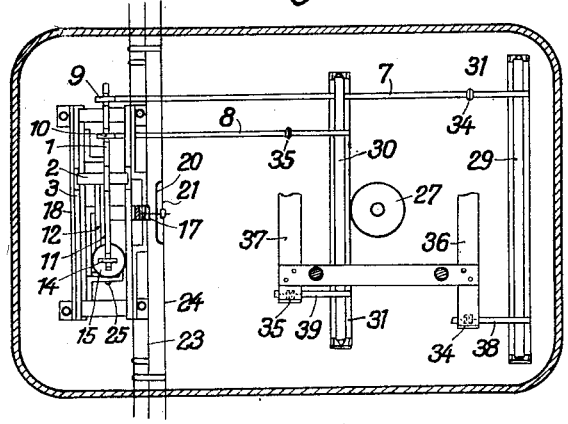
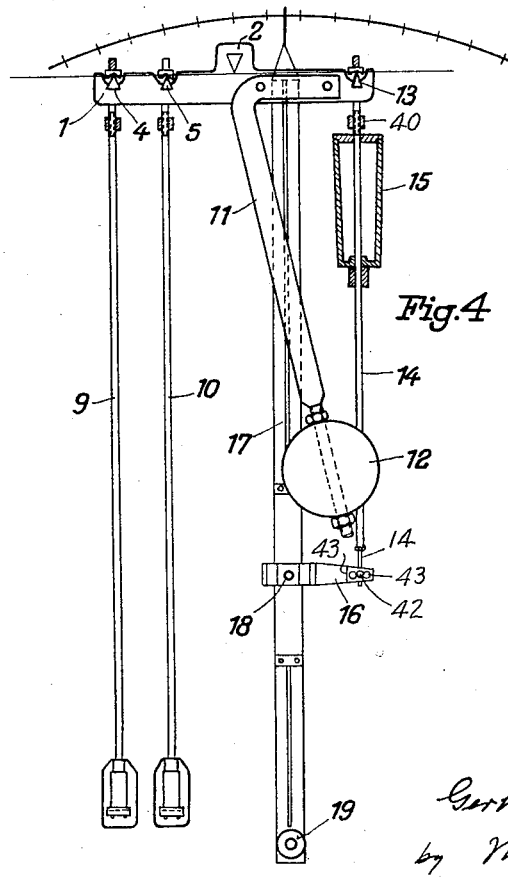
Inventor:
Gerhard Raasche,
by NSchoenborn
Attorney.

May 17, 1932. G. RAASCHE 1,859,059
AUTOMATIC BALANCE
Original Filed Aug. 9, 1930    3 Sheets-Sheet 3

Inventor:
Gerhard Raasche
by W. Gehrenbeck
Atty.

Patented May 17, 1932

1,859,059

UNITED STATES PATENT OFFICE

GERHARD RAASCHE, OF RIGA, LATVIA, ASSIGNOR TO THE FIRM PAUL RAASCHE SÖHNE, OF RIGA, LATVIA, A LATVIAN COMPANY

AUTOMATIC BALANCE

Original application filed August 9, 1930, Serial No. 474,252, and in Latvia August 15, 1929. Divided and this application filed October 8, 1931. Serial No. 567,725.

The present invention relates to the arrangement and connection of the levers in an automatic balance to insure uniform arcuate motion of the deflection indicator to an hitherto unattained extent. The uniform arc-like motion of the deflection indicator is effected by transmitting the irregular arcuate motion of the inclinatory lever to a lever arm of the inclination indicator by means of an ordinary draw bar, the lever arm maintaining a certain ratio to the length of the inclinatory lever so as to bring about the uniform arcuate motion of the deflection indicator. Steel bands which break easily and cause much friction as well as segments which are difficult to produce and require greatest accuracy, means hitherto employed for effecting the uniform arcuate motion of the deflection indicator, can thus be dispensed with.

By way of example, one form of an automatic balance according to the invention is illustrated in the accompanying drawings, in which Figures 1 and 2 are vertical sections of the balance;

Fig. 3 is a horizontal section thereof;

Fig. 4 is a view on an enlarged scale of the connection of the inclinatory lever with the deflection indicator and also with the platform levers;

Figs. 5 and 6 are enlarged fragmentary side elevations of connections of the inclinatory lever with the deflection indicator and also the platform levers;

Figs. 7 and 8 are fragmentary and enlarged detail views of the means for adjustably connecting the draw bar and lever arm.

Figure 9:
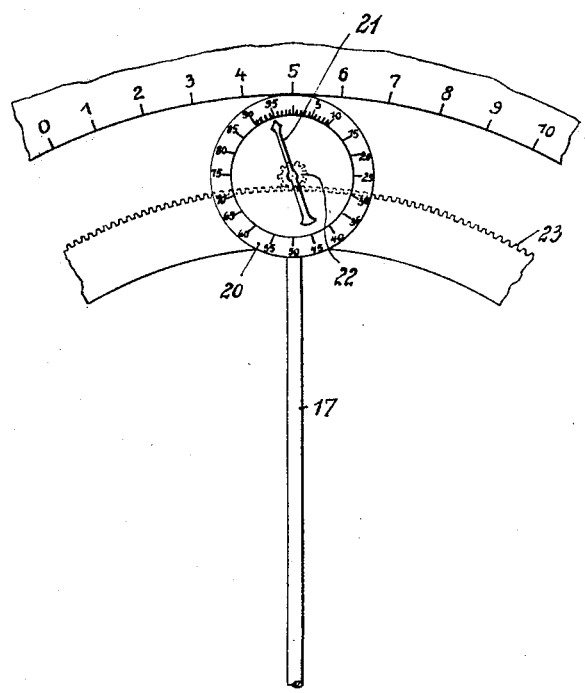
Fig. 9 is an enlarged view of the scale of the indicating device for the small units.

Referring to the drawings, the inclinatory lever 1 rests with its edge-like axis 2 on seats of the standard 3 and carries two edges 4 and 5 to which the load of the platform 6 is transmitted by means of the levers 7 and 8 and the draw bars 9 and 10. To the inclinatory lever 1 the pendulum rod 11 with the adjustable weight 12 is removably attached in order to adjust the lever without the pendulum rod. Furthermore, an edge 13 is provided to be engaged by the draw bar 14 connecting the inclinatory lever with the lever arm 16 of the deflection indicator 17, the bar 14 transmitting the motion of the inclinatory lever 1, by means of the lever arm 16, to the deflection indicator 17 swinging about the axis 18 and vertically balanced by the counterweight 19. The draw bar 14 carries the pot 15 which may be filled with lead as required to compensate the tare. The top end of the indicator 17 carries an indicating device consisting, for example, of a scale plate 20 over which a small pointer 21 circulates to indicate the small units of weight, the pointer being moved by a gear 22 rotating over the toothed segment 23, see Figure 9, and which is the subject matter of a separate recent U. S. patent to me, No. 1,857,870, dated May 10, 1932. To transform the uneven arcuate motion of the inclinatory lever 1 into a uniform arc-like motion of the deflection indicator 17, it is necessary to bring the lever arm 16 into a definite relation to the lever arm of the inclinatory lever 1. The following approximate formula will be found useful in calculating the lengths of the levers:

$$r_x = 1.7453 \, r . \sin \frac{350 - \beta}{4}$$

$\beta$ indicates the full deflection of the member 17 in degrees; $r$, the length of the lever arm 16 of the member 17; and $r_x$, the length of the lever arm of the inclinatory lever 1. The compensation is practically complete, the difference at a deflection of 45° of the indicator 17 being only 1 : 50,000, while, on the average, balances are considered to be good if they show an accuracy of 1 : 1,000. The calculation of leverage according to this formula must be based of course on maximum deflection. This method of compensation affords the advantage that the deflection indicator 17 describes a much greater angle than the inclinatory lever 1 (45° : 26°); furthermore, power can be transmitted to edges by means of long draw bars, and, owing to the high position of the inclinatory lever 1, the pendulum rod 11 may be long and the weight 12 small, while the tare can be compensated conveniently by the lead-filled pot 15, whereby the bar 14 will be firmly disposed again on the edge 13, which is highly important especially for sudden charging and discharging. Another advantage is that, by means of the draw bar 14 and the lever arm 16, which are adjustable as to length, by means of turn buckle 40 and 41, shown in enlarged scale in Figures 5 and 6, whereby the various loads can be harmonized with the graduations of the scales even if the toothed segment 23 should disclose some inaccuracies. The length of the lever arm 16, see Figures 4, 7 and 8, is adjustable by a pin 42 which can be inserted into one of several holes 43 in said arm 16 and registering hole 44 in the bar 14, as shown.

The deflection of the inclinatory lever 1 is limited by the set screws 25 and the impact softened by a rubber buffer 26 on the pendulum rod 11. Moreover, the movements of the bridge 6 are softened by a brake 27. In case of ordinary table and floor balances the small tare difference and zero errors produced by want of level in the support for the scale are eliminated by the set screws 28, while in larger balances involving greater tare differences the curved scale 24 with the toothed segment 23 is adjusted from without by means of set screws, the fulcrum of which coincides of course with the axis 18 of the deflection indicator 17.

This harmonizing of the lever lengths relative to one another to transform the irregular arcuate motion of the inclinatory lever 1 into a uniform motion of the deflection indicator 17, can be carried out without any trouble, as the levers of the balance, on which the platform rests, lead in the same direction directly to the draw bars establishing connection with the inclinatory lever. In balances of the known type this was hitherto impossible for the reason that usually only one lever leads to the inclinatory lever and the other one is placed in opposite direction on the first one by means of suspension, so that the two levers always describe opposite arcs. It was necessary to suspend the platform or the levers to prevent the platform from sliding on the edges during the ascent and descent of the levers. This arrangement can be dispensed with in the balance according to the invention, since the platform rests on the bridge levers equidistantly from the axes of the levers, the levers extend in the same direction and thus describe the same arcs. Therefore, during the descent of the levers uniform transmission of weight takes place, and there will be no distortions as in balances employing levers extending in opposite directions.

Transmission of the platform load to the inclinatory lever 1 is effected, as stated, by means of the platform levers 7 and 8 and the draw bars 9 and 10. The levers 7 and 8 extend in the same direction and are firmly connected with their edge-like axes 29 and 30 which rest on the cup bearings 31. Connection between the levers 7 and 8 and the draw bars 9 and 10 is effected by means of the edges 32 and 33. The edge-like axes 29 and 30 carry further the shoes 38 and 39. The platform 6 thus rests on four points on the various levers, i. e., on the two edges 34 of the lever 7 and the shoe 38 and on the two edges 35 of the lever 8 and the shoe 39. The edges 4 and 5 of the inclinatory lever engaged by the draw bars 9 and 10 are spaced relative to the axis 2 of the inclinatory lever in the same proportion which determines the relative length of the platform levers 7 and 8, but the edges 34 and 35 are absolutely equidistant from the axes 29 and 30. The edges 34 and 35 thus describe the same arc-like motion in the same direction at the ascent and descent of the levers 7 and 8 and the shoes 38 and 39, and the platform 6, the carriers 36 and 37 of which are provided with seats, can rest directly on the edges 34 and 35 without compensating suspension as required in the existing types of balances having oppositely moving levers in order to prevent the seats from sliding on the edges and the balance from failing to weigh.

Of course, shoes like 38 and 39 may be equidistantly positioned from the center on the other side of the levers 7 and 8 also and the latter be moved more towards the center, which is preferable in large balances. For the smallest type of automatic balances the platform levers 7 and 8 may be provided with two arms.

I claim:—

1. Automatic balance comprising a separately disposed deflection indicator pointing out the large units of weight on an equidistantly divided arcuate scale, an inclinatory lever, a lever arm for the said deflection indicator, and a draw bar connecting the said inclinatory lever with the said lever arm, the relative length of the said lever arm and inclinatory lever being proportioned according to the formula $$r_x = 1.7453 \; r . \sin \frac{350-\beta}{4}$$

insuring uniform arcuate motion of the said inclinatory lever, $\beta$ indicating the full deflection of the deflection indicator in degrees; $r$, the length of the lever arm of the deflection indicator; and $r_x$, the length of the lever arm of the inclinatory lever.

2. Automatic balance comprising a separately disposed deflection indicator carrying out a uniform arc-like motion and pointing out the large units of weight on an equidistantly divided arcuate scale, an inclinatory lever, a lever arm for the said deflection indicator, a draw bar connecting the said inclinatory lever with the said lever arm, two platform levers of different length firmly connected at one end with parallel axes and adapted to move about these axes in the same direction, draw bars transmitting the motion of the other ends of the said platform levers to the said inclinatory lever and engaging the said inclinatory lever according to the ratio of length of the platform levers at pivot distances, shoes firmly connected with the axes of the said platform levers and parallel to the latter, and a platform supported equidistantly from the axes of the said platform levers at four points by the said levers and shoes.

In testimony whereof I have affixed my signature.

GERHARD RAASCHE.